Patented Dec. 3, 1935

UNITED STATES PATENT OFFICE 2,023,014

PREPARATION OF SOLUBLE LACTALBUMIN

George E. Flanigan and George C. Supplee, Bainbridge, N. Y., assignors to The Borden Company, New York, N. Y., a corporation of New Jersey No Drawing. Application January 6, 1933, Serial No. 650,499

19 Claims. (Cl. 99—11)

This invention relates to the production of albumin and particularly to the preparation of water soluble lactalbumin.

The major constituents of milk are butter fat, casein, lactalbumin, lactose, salts and water. The first four of these constituents are recovered commercially from milk and the present invention relates particularly to the recovery and subsequent treatment of the lactalbumin.

Commercial lactalbumin as generally produced is insoluble in water and contains impurities such as the phosphates precipitated out with albumin, the casein which is not completely precipitated or filtered off in the separation of it from the milk, and other materials, such as the filter aids, for example, diatomaceous earths, used to facilitate filtering.

The purpose of this invention is to provide a method for the production of a lactalbumin of different quality than that commercially produced and of greater purity and which is readily soluble in water. Another object is to provide an improved method for the separation of albumin and an improved method for converting this into a water soluble product which may or may not, as contingencies warrant, be reduced to dryness by appropriate means without loss of solubility when thus reduced to the dry state. Other objects will become apparent.

The process described herein is, for example, applicable to whey or other albuminous solutions obtained from milk, or skim milk, or buttermilk, after removal of the butter fat and casein by known means. The usual practice in the recovery of lactalbumin from whey is to treat the whey resulting from the removal of butter fat and casein from milk, with lime or other suitable material to give a pH of approximately 6.8 and to heat the mixture to boiling or near boiling, in which instance phosphates and albumin are precipitated, substantially together, and a filter aid is usually added to facilitate the filtering of the product.

We have found that by adjusting the hydrogen ion concentration of the whey to a pH of about 4.55, which in most instances involves the addition of suitable acids, for example, such as hydrochloric acid, and then heating, the albumin will precipitate completely, or substantially so, and will flocculate beginning at about 160° F. and reaching its maximum degree of flocculation at approximately the boiling temperature of the mixture. Although this pH value of 4.55 may be considered as substantially the preferred value, we have found that in certain wheys a range of pH values at this point of the process between about 4.85 and 4.35 gives substantially the same results. For certain purposes acids other than hydrochloric acid may be desirable to bring about the pH value adjustment at this state of the process as, for example, phosphoric acid. The albumin precipitated by the above procedure can be separated in a filter-press or be allowed to settle, decanted and then filter-pressed or otherwise separated. This albumin, which is substantially water insoluble, may be washed to remove impurities and may be subjected to the second step of the process in a moist state or it may be dried and ground and then converted into the soluble form.

By taking albumin separated as described above or as otherwise produced, either wet or dry, and adding a definite quantity of water to it, and then adding sodium hydroxide or other base or basic salt, for example, such as $Na_2HPO_4$, $Na_2CO_3$, $NaHCO_3$, $NH_4OH$, the albumin will go into colloidal solution after passing through various gel stages.

The speed of solution and the rate of passing through various gel stages are dependent upon various factors including temperature of the mix, speed of agitation, size of particles of the lactalbumin and especially the lactalbumin-water-alkali ratio.

After the material is in colloidal solution the mixture is treated with a suitable acid, for example, such as hydrochloric or phosphoric acid, so that a lower pH value is obtained, but not so low as to cause reprecipitation of the lactalbumin now in solution. This injunction is to be interpreted as applicable primarily to the continuity of the phase of the process now being described as it will be shown later that, if for instance, it is decided to further purify the product such reprecipitation is necessary. Our experiments have shown that in most instances it is undesirable to reduce the pH value below 6.4. However, under certain conditions pH values slightly lower than this may be used without detriment to this particular phase of the process or the resulting product. Available data, however, show that a pH value of 5.56 causes a partial reprecipitation of the albumin and since this condition is to be avoided this pH value or lower values are obviously detrimental to the process because the limiting criterion, as mentioned above, is that the pH value should not be reduced to a point which permits reprecipitation of the albumin. The solution may now be dried by any suitable means not harmful to the final product, preferably by any suitable spray drying apparatus operated under the usual temperature conditions prevailing in such units, especially such units as are used in the drying of milk.

The following is a specific example of our improved method, although it is not intended to limit ourselves to the details of this illustrative example.

Enough hydrochloric acid is added to 6,000 pounds of whey which is substantially free from butter fat and casein, to bring the pH of the whey to approximately 4.55. Where casein has previously been precipitated by acid it requires approximately 4 pounds of hydrochloric acid, sp. gr. 1.19 (approximately 37% HCl); to bring the whey to the desired pH value. The solution is then heated to approximately its boiling temperature with or without agitation, the albumin being precipitated and flocculated thereby.

The precipitated albumin may be removed from the liquid by any suitable method, such as, by filter-pressing or by allowing the precipitated albumin to settle, decanting the supernatant liquid and then filter-pressing the remainder. If desired, the albumin from the filter-press may be dried in a hot-air tunnel drier or other suitable drier and pulverized into a convenient form for storing or shipping. This product is insoluble in water.

1,000 pounds of water at a temperature of about 80° F. is then run into a tank and 3.75 pounds of sodium hydroxide (caustic flake) is added and while the solution is being violently agitated, 50 pounds of dried water-insoluble albumin, produced as described above or otherwise, is added. A heavy gel is formed which gradually becomes thinner and thinner and finally a colloidal solution of high fluidity is obtained. The above water-alkali-albumin ratio is to be considered the preferred ratio, although other ratios may be used, as for example, 1,000 pounds of water, 50 pounds of albumin, and 2.5 pounds of sodium hydroxide. With this proportion, however, a greater length of time will be required for passing through the various gel stages to solution, other conditions being equal; or 5 pounds of sodium hydroxide may be used with the above mentioned amounts of water and albumin and with other conditions being equal the time required for solubilization will be reduced. In general, however, an excess of alkali above the ratio mentioned in the preferred example is to be avoided.

Instead of the dried albumin produced as described above, wet albumin may be used, the amount of water in the latter being taken into account so that less water will be added at the start. With the amounts and ratio of water to sodium hydroxide to albumin described above, the gel state was reached in a few minutes and the fluid state in approximately 90 minutes.

After the mass has reached the fluid state, it may be brought to a pH of approximately 6.9 by adding approximately 8 pounds of about 37% hydrochloric acid, (sp. gr. 1.19), care being taken not to make the solution too acid, as this causes precipitation of the albumin. It is preferred to add the acid in the form of a dilute spray or in such a manner as to give the maximum distribution with the minimum concentration, in order to avoid local concentration of the acid and re-precipitation of some of the albumin.

After having adjusted the mass to the above acidity, the material may be dried by spray-drying it under the ordinary operating conditions prevailing in spray-drying of milk, for example, by atomizing it into air heated to about 180° F., whereupon it dries almost instantly.

This dried product when mixed with water goes into solution. The product from the above operations may be further purified, if desired, by known means, to remove sodium chloride resulting from the action of the hydrochloric acid on sodium hydroxide, and other impurities.

It is preferred to grind the dried insoluble albumin to small sized particles, for example, 40 to 100 mesh. Although the coarser particles go into solution, the rate of solution is increased as the particles become smaller.

It is apparent that various acids, temperatures, alkalis, etc. may be substituted by one skilled in this art for those given. For example, other alkaline materials, such as certain carbonates or bicarbonates or hydroxides or ammonia may be used in place of the sodium hydroxide. Also, variations may be made in the proportions and concentrations of whey, albumin and acid, while utilizing the invention described herein. To make a good grade of soluble albumin as described above, it is desirable, but not necessary, that substantially all the casein be removed from the whey, which may be done by well known procedures, such as centrifuging or other commercial methods.

Although we prefer to follow the procedure described above, the albumin-alkali-water-temperature relation may be altered without changing the solubility of the product. For instance, the amount of water can be more or less and the alkali used can be varied so that a longer or shorter period of time will be required to put the product into solution. The temperature of the mass during the reaction may be varied very widely, but care should be used not to hold the temperature too high for too long a time, so as to avoid any material or generally obvious manifestation of change in chemical constitution of this product. Other methods of drying may be used but care should be exercised not to use such a high temperature for such a long period of time as will materially affect the solubility of the final product.

By following the first steps of the above procedure, an insoluble albumin, containing approximately 88% protein (calculated as nitrogen times 6.38) may be obtained. This material can be further washed and purified, if desired, to a higher degree of purity. The soluble albumin produced by the method described, may contain approximately 75% protein (calculated as nitrogen times 6.38). It is soluble in water and in the light of now known facts the physical characteristics of its water solutions are similar to those of the lactalbumin found in milk.

The above illustrative examples have been cited as methods whereby soluble lactalbumin may be prepared by our methods in either a wet or dry condition. The methods as described may be used for obtaining either wet or dry products with variable or different degrees of purity. We shall now cite illustrative examples showing how the products obtained as above may be further purified.

In our first illustrative example we cautioned against reducing the pH value of the solution, after solubilization, to a point which would permit re-precipitation of the albumin. The aforementioned precaution at that juncture was introduced only for the purpose of the particular illustration then cited. At the same point of the process it may be desirable and even necessary in order to produce a more highly purified product, to reduce the pH value to a point where the albumin is entirely or substantially entirely precipitated and flocculated. Such a procedure and contingent alterations of the example previously cited are now described in the following example.

After solubilization of the albumin with alkali as previously described, suitable acids of strength and concentration as noted above and in a similar way as above, are added, but to a point whereby the pH value of the mixture is reduced to approximately the same range as required for the precipitation of insoluble albumin from whey, which, as previously noted, is about 4.85 to 4.35. Within this range of pH values the previously solubilized lactalbumin is again completely or substantially completely precipitated and flocculated. This precipitated albumin may now be readily filtered and washed free from impurities in the usual manner. The insoluble albumin thus obtained may now be resuspended in water and sufficient hydroxyl (OH)-ions added to bring about resolubilization which will now take place at a pH value below that of neutrality or below pH 7. This product is relatively more free from impurities than the product previously described and the physical character of its water solutions are similar to those of the lactalbumin found in milk. Likewise this solution obtained as mentioned immediately above may be spray dried as heretofore noted and the physical characteristics of the water solutions of the dried material will likewise be similar to those of the lactalbumin found in milk.

As a further mode of purification, solutions of the water soluble product, or suspensions of the water insoluble product after proper pH adjustment, may be dialized for the purpose of removing soluble salts or other dializable substances. Solutions or suspensions which may be used for dialysis may be obtained at appropriate places in the processes hereinbefore described, depending upon particular operating contingencies and the degree of purity desired. Dialysis of the previously solubilized products yield a soluble albumin of high degree of purity and whose water solutions possess physical characteristics similar to those of the lactalbumin found in milk.

In using the term water soluble and referring to solutions of albumin in the description and claims, these terms are used in their generally accepted sense in this art and as referring to an albumin which is capable of producing a colloidal solution in water and as referring to colloidal solutions, respectively, as differentiated from true solutions.

The terms used in describing this invention have been used in their descriptive sense and not as terms of limitation, and it is intended that all equivalents thereof be included within the scope of the appended claims.

What we claim is:

1. In the preparation of soluble lactalbumin, the steps comprising adjusting the pH of whey to about 4.35–4.85, heating it to above 160° F., separating the precipitated lactalbumin and agitating it with a solution of an alkaline material of the group consisting of bicarbonates, carbonates and hydroxides of the alkali elements or ammonia, adjusting the acidity of the resulting fluid mass to a pH of about 6.4–6.99 and evaporating it to dryness substantially instantaneously.

2. In the preparation of soluble albumin, the steps comprising adding sodium hydroxide to water in the proportion of about 0.25% to 0.5% sodium hydroxide and agitating this solution with insoluble albumin in the proportion of about 5% of the weight of the solution until the mass becomes fluid, adjusting the pH of the fluid mass to about 6.80–6.99 and spray-drying the solution.

3. A method of converting insoluble lactalbumin to soluble lactalbumin, comprising increasing the hydroxyl-ion concentration of the mass to produce a distinctly alkaline reaction and to render the mass fluid and decreasing the pH value to slightly below 7 when the mass reaches a fluid state, said decrease in pH being insufficient to precipitate the albumin.

4. A process as described in claim 3 in which the alkaline material is of the group consisting of carbonates, bicarbonates or hydroxides of alkali elements or ammonia.

5. A method as defined in claim 1 in which the albumin is reprecipitated with acid and redissolved to remove the impurities before the final drying.

6. A method as defined in claim 3, in which the pH is decreased to about 6.4 to 6.9.

7. A method of converting insoluble lactalbumin to soluble lactalbumin, comprising treating the insoluble lactalbumin with a dilute alkaline solution to convert the mass to a fluid state and thereupon decreasing the pH value to slightly below 7, said decrease in pH being insufficient to precipitate the lactalbumin.

8. A method as defined in claim 7, in which the slightly acid solution is rapidly evaporated to dryness.

9. A method of preparing soluble lactalbumin, comprising adjusting the pH of whey to about 4.35 to 4.85, heating it to above 160° F., separating the precipitated lactalbumin and agitating it with a solution of an alkaline material which will result in increasing the hydroxyl-ion concentration of the mass to produce a distinctly alkaline reaction and will reduce the mass to a fluid state, and decreasing the pH value of the mass slightly below 7 upon reaching the fluid state.

10. A method as defined in claim 9, in which the pH is decreased to about 6.4 to 6.9.

11. A method as defined in claim 3, in which the slightly acidified solution of lactalbumin is evaporated to dryness.

12. A method as defined in claim 9, in which the slightly acidified solution of lactalbumin is evaporated to dryness.

13. A method as defined in claim 9, in which the slightly acidified solution of lactalbmin is spray dried.

14. A method as defined in claim 9, in which the lactalbumin is reprecipitated with acid and is thereafter redissolved by adding sufficient alkaline material to increase the pH to slightly below 7.

15. A method as defined in claim 3 in which the slightly acidified solution of lactalbumin is spray dried.

16. A method as defined in claim 3 in which the pH value is decreased by adding acid in the form of a dilute spray.

17. A method as defined in claim 9 in which the lactalbumin is reprecipitated with acid, washed and thereafter resolubilized by increasing the pH to slightly below 7.

18. A method of converting insoluble lactalbumin to soluble lactalbumin, comprising increasing the hydroxyl-ion concentration of the mass to produce a distinctly alkaline reaction and to render the mass fluid, decreasing the pH value to below 7 when the mass reaches a fluid state, such decrease in pH being sufficient to reprecipitate the lactalbumin, and thereafter washing and resolubilizing the reprecipitated lactalbumin by increasing the pH value to slightly below 7.

19. A method as defined in claim 18 in which the resolubilized lactalbumin is spray dried.

GEORGE E. FLANIGAN.
GEORGE C. SUPPLEE.